April 4, 1961
G. H. ALLGEYER ET AL
SYNCHRO-TIE RECEIVER MOTOR
SYNCHRONIZED-SPEED CONTROL
2,978,619
Filed June 17, 1957
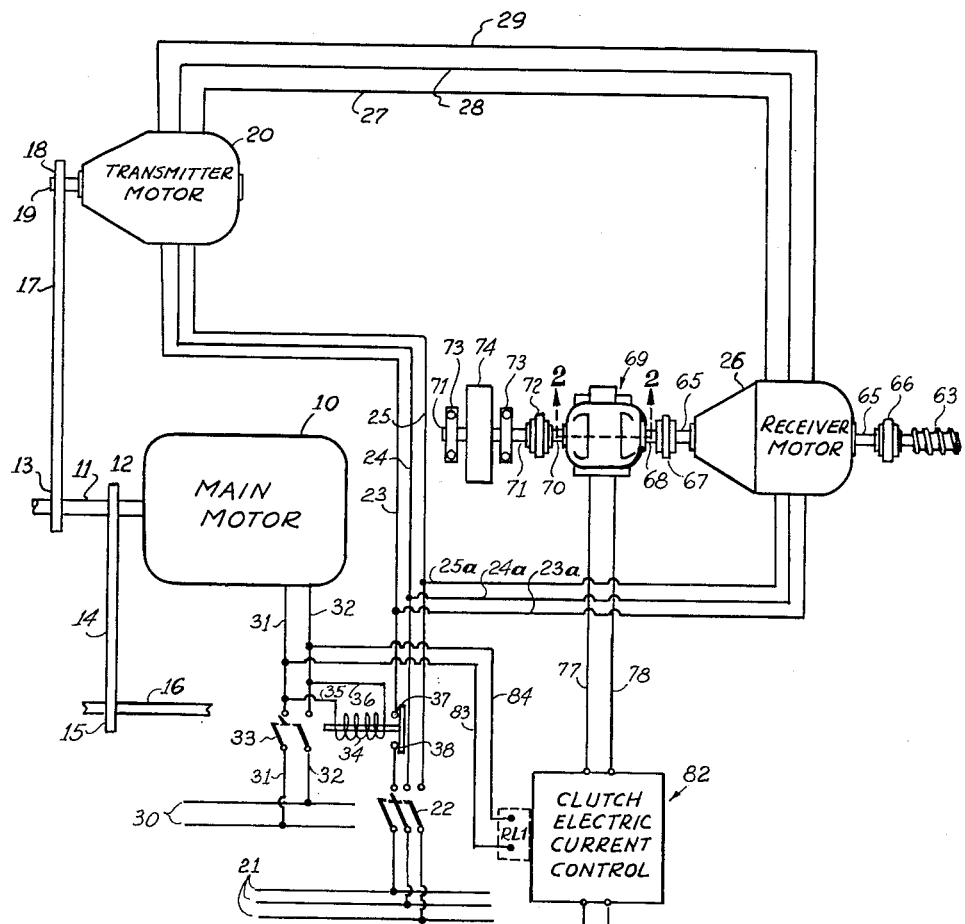
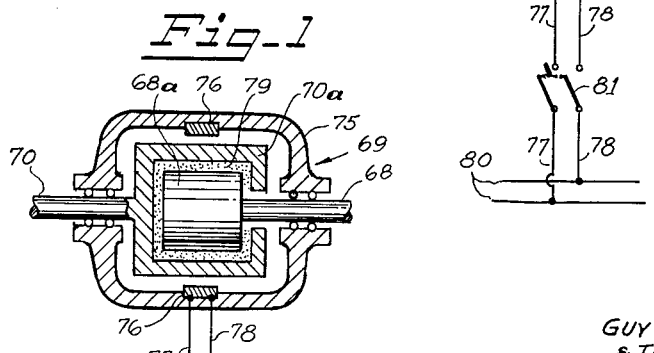
INVENTORS
GUY L. ALLGEYER, RICHARD L. EARLY
& THOMAS B. SORBIE
BY
J. R. NELSON &
W. A. SCHAICH
ATTORNEYS April 4, 1961
G. H. ALLGEYER ET AL
SYNCHRO-TIE RECEIVER MOTOR
SYNCHRONIZED-SPEED CONTROL
2,978,619
Filed June 17, 1957
3 Sheets-Sheet 2
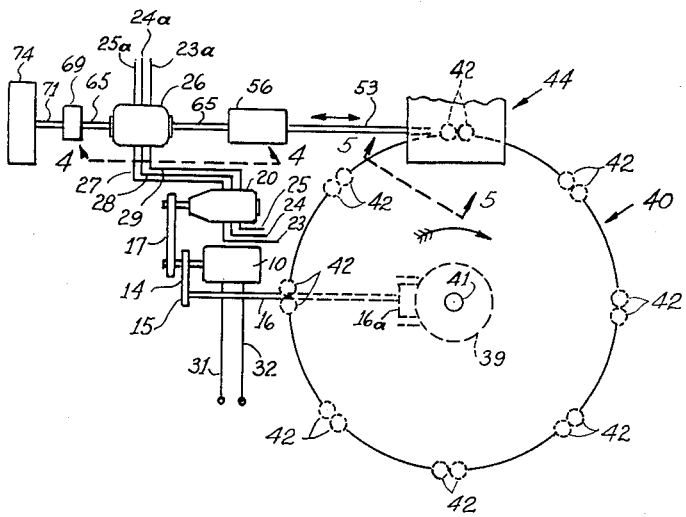
Fig_3
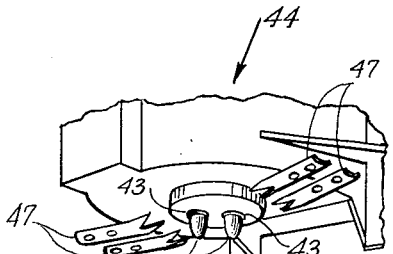
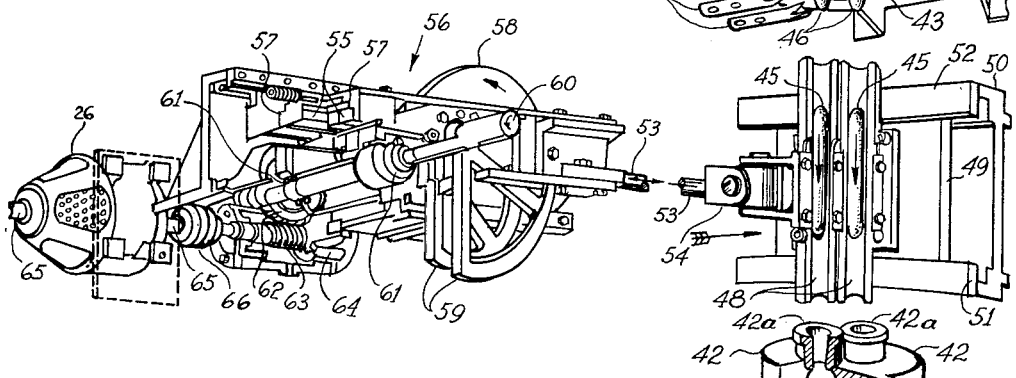
Fig_4
Fig_5
INVENTOR.
GUY H. ALLGEYER, RICHARD L. EARLY
& THOMAS B. SORBIE
BY
J. R. NELSON &
W. A. SCHAICH
ATTORNEYS

United States Patent Office 2,978,619
Patented Apr. 4, 1961

2,978,619

SYNCHRO-TIE RECEIVER MOTOR SYNCHRO-NIZED-SPEED CONTROL

Guy H. Allgeyer, Richard L. Early, and Thomas B. Sorbie, Toledo, Ohio, assignors to Owens-Illinois Glass Company, a corporation of Ohio Filed June 17, 1957, Ser. No. 666,158

14 Claims. (Cl. 318—24)

This invention relates to means and method of controlling the synchronized speed of an electric motor driving a cyclically fluctuating load through a predetermined cycle calling for synchronized movement with relation to a substantially constant load having a predetermined rotation. The motor driving this fluctuating load is coupled as a receiver motor of a synchro-tie motor drive system synchronized with the main drive motor driving the constant load. The particulars of such a synchro-tie system are well known in the art and will be presently summarized.

In a synchro-tie drive system, a main motor is set at a speed to drive the main load of the system at a given rate of movement representing one of the units or machines of a group of power driven mechanisms. One or more auxiliary loads, represented by other units or machines of the group, may be made to turn or move in synchronized relationship and in unison with the main load by driving them with synchronous electric induction motors normally having wound-rotors connected to receive current as a function of rotation of the main motor.

In its simplest form, the synchro-tie drive system consists of two duplicate wound-rotor induction motors with their stators connected to a three phase power supply and their rotors connected together. One motor is tied mechanically to be driven by the main drive motor at a speed corresponding to the speed necessary to synchronize the main and auxiliary loads. This driven motor is commonly known as the "transmitter motor" and the motor driving the auxiliary load is known as the "receiver motor." With the motors thus connected and properly synchronized, any rotation of the rotor of the transmitter motor causes an equal rotation of the rotor of the receiver motor and vice versa.

In operating synchro-tie motor drives where the auxiliary load is driven in a predetermined cycle calling for accelerating and decelerating rates of movement in synchronized relationship with the substantially constant rate of movement of the main load, the receiver motor is called upon to deliver torque in pulsating or fluctuating amounts throughout each cycle. It is well known that if the peak torque demand on the synchronous receiver motor exceeds the torque capacity of the motor, the motor will suddenly jump out of step with the transmitter motor and break its synchronization with the rest of the system. The entire machinery must then be stopped and re-synchronized. To prevent this happening, it has been necessary in synchro-tie systems to use unnecessarily high torque capacity receiver motors to insure against these peak demands of the fluctuating load, when actually the normal torque requirement for the major portion of movement of the auxiliary load is considerably less than this peak value.

This invention contemplates, as one of its objects, coupling a flywheel to the receiver motor to prevent the receiver motor from breaking synchronization, however, if the flywheel is coupled solidly to the motor, more torque is required to start the load, since the receiver motor must start the flywheel in addition to starting the auxiliary load, and this will sometimes pull the receiver motor out of synchronization with its transmitter motor. Upon stopping the system, it is desirable to have both loads come to rest in synchronized relationship with each other and if the flywheel is not uncoupled for stopping, it will drive the receiver motor and generally break the synchronized relationship of it and its load with the rest of the system.

It is, therefore a further object of this invention to provide means and method of advantageously storing a portion of the energy delivered by the receiver motor by a coupled flywheel while at running speed and while the torque demands on the motor are at normal values and release said stored energy therefrom to aid in driving the motor whenever peak torque demands on it tend to slow it down from the synchronized running speed, yet uncouple the flywheel from the motor during its starting and stopping when the flywheel is disadvantageous.

Another object of the invention is to provide such means and method to control synchronized speed of the receiver motor and prevent its breaking synchronized speed, yet permit the use of smaller synchro-tie receiver motors for driving the pulsating or fluctuating loads.

A further object of the invention is to provide automatic electric control means for gradually coupling a flywheel to the receiver motor after it is started and quickly uncoupling the flywheel therefrom upon stopping.

Another object of the invention is to provide such means and a method for controlling synchronized speed of a synchro-tie receiver motor, as mentioned in aforesaid objects, adaptable for driving synchronized machinery elements of glass manufacturing machinery having fluctuating load characteristics.

The specific nature of this invention, as well as other objects and advantages thereof, will become apparent to those skilled in the art from the following detailed description, taken in conjunction with the annexed sheets of drawings, on which, by way of preferred example only, is illustrated an embodiment of the invention.

On the drawings:

Fig. 1 is a schematic plan view of the synchro-tie drive system utilizing the invention.

Fig. 2 is a sectional elevation view of a magnetic particle clutch, taken along line 2—2 of Fig. 1.

Fig. 3 is a schematic plan view, showing the invention applied to drive a rotatable glass forming machine, representing the constant main load driven by the main drive motor of a synchro-tie system, and a reciprocating synchronized glass-gob guide, representing the fluctuating auxiliary load driven by the receiver motor of the system.

Fig. 4 is a perspective view, taken along lines 4—4 of Fig. 3, showing the receiver motor coupled through a cam operated drive transmission to provide reciprocating movement to the glass-gob guide.

Fig. 5 is a perspective view, taken along lines 5—5 of Fig. 3, showing a glass furnace feeder and reciprocating glass gob guide delivering gobs of glass to blank molds carried near the periphery of the rotating glass bottle machine.

Figure 6:
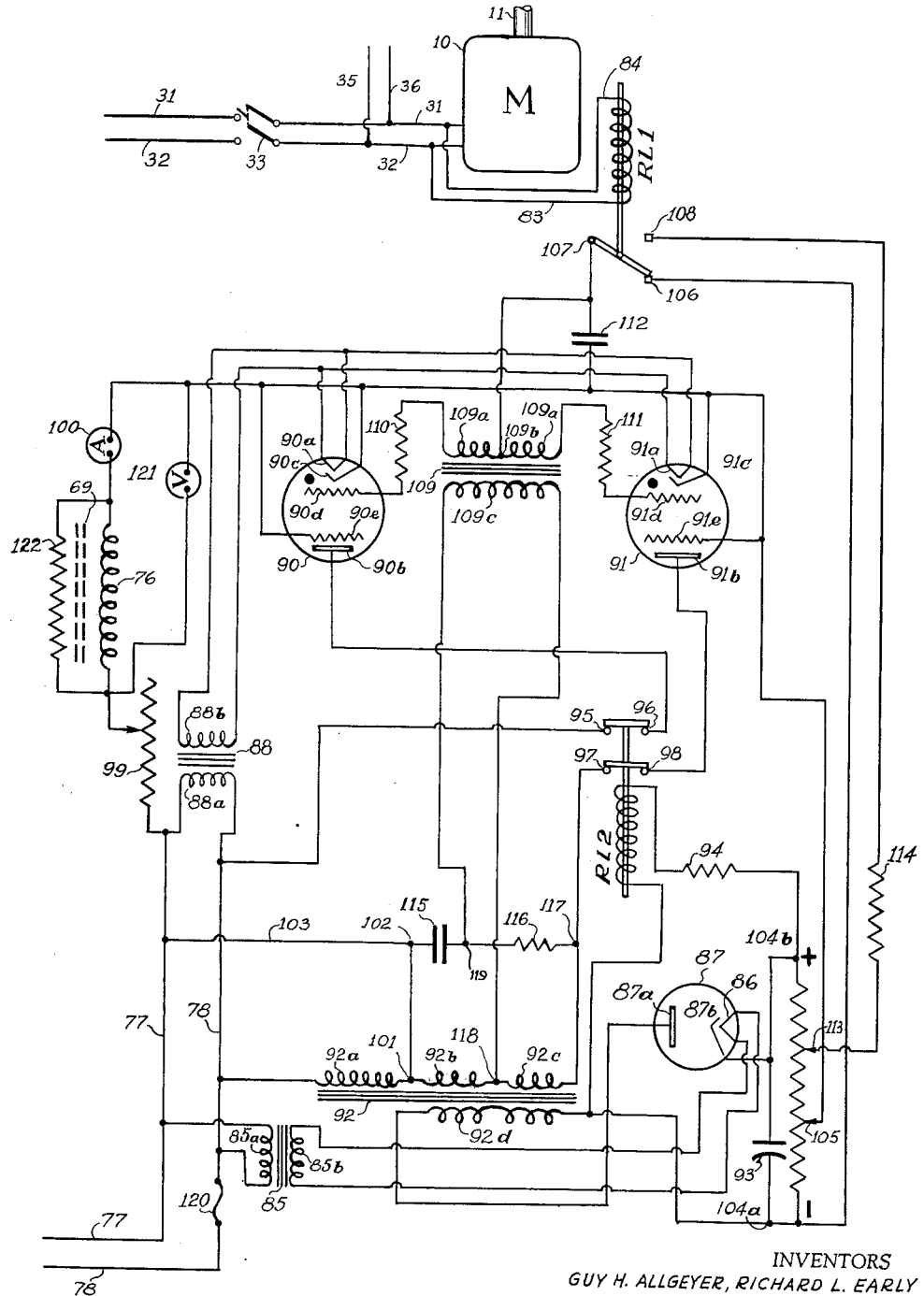
Fig. 6 is a wiring diagram of the automatic controls for operating the magnetic clutch for coupling and uncoupling the rotatable flywheel to the drive shaft of the receiver motor.

As herein illustrated and described, the invention is particularly adapted for use in synchronizing a reciprocating glass gob guide which intercepts freely falling gobs of glass severed from streams of glass adjacent a glass furnace feeder orifice and guides them laterally during the remainder of their fall so that they are received at the open top of their blank molds passing vertically beneath the gob guide. The blank molds are located at spaced intervals near the periphery of a glass forming machine rotated on its vertical axis at a constant speed. The glass forming machine illustrates the main load and is driven by the main drive motor of the synchro-tie system. The glass gob guide is mounted beneath the glass furnace feeder orifice to reciprocate in a predetermined cyclical manner in synchronized relation to the circular movement of the blank molds passing in underlying relationship. For each blank mold station on the rotating forming machine that reaches the position to receive a charge of glass from the furnace feeder, the reciprocating gob guide must move through one complete cycle of its movement to deliver the glass gobs to their molds. During each cycle the gob guide mechanism, beginning from rest, must accelerate in one direction, decelerate in that same direction, come to rest and reverse its direction; then accelerate and decelerate in this reversed direction and again come to rest. This movement creates a fluctuating torque demand on the receiver motor of the synchro-tie system and represents a cyclically pulsating or fluctuating auxiliary load in the system.

Referring now to the figures, it is seen that, in Fig. 1, an electric main drive motor 10 has its drive shaft 11 provided with drive sprockets 12 and 13. Sprocket 12 transmits power through drive chain 14 to sprocket 15 keyed on shaft 16. Shaft 16 is connected to drive the main load. Sprocket 13 transmits power through drive chain 17 to sprocket 18 keyed to the driven shaft 19 of transmitter motor 20. Transmitter motor 20 is an A.C. three phase induction motor which is driven and functions as a frequency transmitter, as will be presently explained. The stator windings of motor 20 receive three phase line power, designated by reference numeral 21, which is connected to the respective terminals of switch 22. Switch 22, when closed, completes the connection to the stator windings in motor 20 (not shown) through lines 23, 24 and 25. The receiver motor 26, which is a similarly wound A.C. three phase induction motor has its stator windings similarly supplied with three phase line current through lines 23a, 24a and 25a connected to their complementary lines 23, 24 and 25 leading from switch 22. Thus, when switch 22 is closed, the stator windings of transmitter motor 20 and receiver motor 26 are similarly energized. The wound rotors of both motors 20 and 26 are electrically connected together by lines 27, 28 and 29. Accordingly, as driven shaft 19 carrying the rotor of transmitter motor 20 is rotated, current is transmitted from the motor of the transmitter motor 20 to the rotor of the receiver motor through lines 27, 28 and 29 at a frequency dependent upon the speed of transmitter motor 20. The frequency of the current conducted from the transmitter motor rotor to the rotor of the receiver motor controls the speed of the receiver motor to electrically tie the two together to run at the same synchronized speed.

Switch 22 is closed prior to starting up the system and remains closed until it is desired to shut down the system for long periods or repairs to the circuit. Once the motors 20 and 26 are synchronized, the stators are kept energized. If the system is shut down for shorter periods, two phases of the stator current are removed, as will be presently described.

Main motor 10 is shown as a D.C. motor, however, an A.C. motor may be readily used. Motor 10 is connected to a D.C. supply, designated at reference numerals 30, by lines 31 and 32 through a starter switch 33. A relay 34 is connected across lines 31 and 32 by lines 35 and 36 at points intermediate starting switch 33 and motor 10. With switch 22 closed, the main drive motor 10 is started by closing switch 33. Current then flows to motor 10 in lines 31 and 32 and also energizes relay 34 closing contacts 37 and 38 in A.C. line 23, which completes the connection of three phase power to the stator of motors 20 and 26. Relay 34 permits starting all three motors of the system upon closing switch 33. When motor 10 is stopped by opening switch 33, relay 34 breaks its contacts at 37 and 38 and reduces power applied to the stator circuits of motors 20 and 26 from three phase to single phase. By keeping the single phase power in the stators of the motors after shutting down the main motor 10, enough power remains in the field of the transmitter and receiver motors to keep them tied together and they will stop at the same relative spot in their rotation with relation to the position of the main motor. Hence, upon restarting the main motor 10, it and receiver motor 26 will start out so that their loads will remain in their same synchronized relationship as existed upon stopping.

Once the system is started by closing switch 33 and relay contacts 37 and 38 close the there phase stator circuits, as aforesaid, the main drive motor 10 imparts rotation to shaft 16. Shaft 16, it is seen on Fig. 3, drives a bevel gear 16a in mesh with a bull gear 39 at the base of glass forming machine 40 (represented schematically). Bull gear 39 is mounted on a vertical shaft 41 of forming machine 40. Vertical shaft 41 is coupled to drive forming machine 40 and is driven to impart clockwise rotation. Forming machine 40, which is the speed governing unit (main load) of the synchro-tie system, and is rotated at a substantially constant speed so that its blank molds 42 arrive at a point under the orifices 43 (Fig. 5) of the glass furnace feeder, designated generally at reference numeral 44, at equally spaced intervals and in a position to receive severed gobs of glass 45 therein. The glass gobs 45 are formed in the conventional manner by feeding streams of molten glass 46 through bottom orifices 43 in feeder 44. After the desired amount of glass has issued from the orifices, corresponding pairs of reciprocating shears 47 are reciprocated to pass through the glass stream 46 and sever the gob 45 therefrom. The weight of glass issued between severing intervals and the frequency of reciprocating the shears are governed by the size and rate of rotation of molds 42 on glass forming machine 40. Shears 47 are driven by another synchro-tie motor drive (not shown) tied to the main drive motor 10 and actuated in synchronized relationship so that a mold 42 on the rotating machine 40 will be in the correct spacial relationship at the time shears 47 sever a gob 45 to permit the gob to be guided into the open end 42a of the oncoming mold 42. The reciprocating shears 47 are cam actuated to convert rotary motion of their drive motor (not shown) into reciprocating motion. This too represents a cyclically fluctuating load, and it should become apparent that this invention could also be applied with like advantage to drive that load. It is felt there are a great many such pulsating loads in synchronized motions in machines or groups of machines to which this invention could readily be adapted. Therefore, the illustration and description herein of the glass gob guide is intended as but one example of such a pulsating load.

Referring particularly to Figs. 4 and 5 and with occasional reference to Figs. 1 and 3, the description of the glass gob guide will now be presented.

A pair of side by side gob guides 48 are mounted on an arcuate cross head plate 49. Plate 49 is held in corresponding top and bottom arcuate grooves 50 and 51 of crosshead member 52 to slide longitudinally therein. Member 52 is rigidly mounted on the furnace feeder framework (not shown) in underlying relationship to furnace feeder 44 so that gob guides 48 travel laterally to intercept severed gobs 45 as they fall freely. The horizontal path of movement of the gob guides 48 is in an arcuate vertical plane in corresponding vertical alignment to a portion of the circular path of movement of the corresponding openings 42a of molds 42. A pusher rod 53 is connected to crosshead plate 49 by a universal joint connection 54 mounted thereon.

In Fig. 4, pusher rod 53 is connected to a slidable member 55 (shown partially cut-away at its left hand end in Fig. 4) and forms part of a cam-operated transmission assembly, designated generally by reference numeral 56, having anti-backlash characteristics. Assembly 56 is a conventional unit supported on common framework with crosshead member 52 (Fig. 5). Briefly described, it operates by having cam followers (not shown) rotatably mounted on member 55 so that they ride on opposite sides of cams 58 and 59. Member 55 is mounted for reciprocating movement in slide-ways 57 of the assembly. Cams 58 and 59 are keyed on shaft 60 near its end and shaft 60 is mounted for rotation in bearings 61 of assembly 56. Rotation of shaft 60 and cams 58 and 59 impart reciprocating motion to member 55 through the aforementioned cam followers. Pusher rod 53 in turn imparts similar reciprocating movement to crosshead plate 49 and its attached gob guides 48. The pitch of cams 58 and 59 produce the desired cycle of to and fro movement of gob guides 48 along its arcuate path.

Power is transmitted to shaft 60 by pinion 62 keyed on shaft 60. Pinion 62 meshes with worm gear 63 which is rotatably mounted in housing 64 (shown partially cutaway in Fig. 4), and is connected externally to the drive shaft 65 of receiver motor 26 at coupling 66. Receiver motor 26 is mounted to common framework with assembly 56 (shown in phantom line on the near side of motor 26 in Fig. 4).

Through the mechanism just described, a synchronized rotational speed of receiver motor 26, transmits its power through the worm and pinion 63—62, shaft 60, cams 58 and 59, cam followers (not shown) on member 55, and push rod 53 to reciprocate gob guides 48 in their proper synchronized relationship to intercept the falling glass gobs 45 and guide them along an arcuate path to be received in molds 42. The torque requirements on receiver motor 26 to drive this mechanism and reciprocate the gob guide 48 in the desired manner fluctuate during each cycle from a high torque value to zero torque to a high torque value back to zero torque again. A curve of the torque demands through each cycle very nearly approximate a sine curve and the torque capacity of receiver motor 26 to drive its cyclically fluctuating auxiliary load at synchronized running speed must normally be equal to the peak torque value of the sine curve plus a margin of safety necessary to prevent the motor from breaking a synchronization with its transmitter motor, as previously mentioned herein.

This invention provides means and method of receiving and storing energy available from the receiver motor during times of the reciprocating load cycle when torque demands are less than their peak value and returning some of this stored energy to the receiver motor at times in this cycle when torque demands are at or near their peak value to permit: (1) smoother operation of the auxiliary load, (2) better control of synchronized speed of the motor, (3) the use of smaller motors, (4) more efficient operation of the motor, and (5) most important of all, prevent the motor from breaking synchronized relationship with its transmitter motor and main drive motor when the torque demands start to exceed the torque capacity of the receiver motor at the particular synchonized running speed.

Referring now to Figs. 1, 2 and 6 this feature of the invention will now be described.

In Fig. 1, the drive shaft 65 extends through receiver motor 26 and is connected at coupling 67 to shaft 68 which is bearing mounted for rotation with one of the rotatable elements of a clutch 69. The other cooperating rotatable element of clutch 69 is mounted on shaft 70 for rotation. Clutch 69 may be any suitable conventional form of mechanically, hydraulically, or electrically operated clutch. Details of an electrically operated clutch, preferred for illustration herein, will be presently described. Shaft 70 is connected to shaft 71 by coupling 72. Shaft 71 is bearing mounted for rotation in frame mountings 73 rigidly connected to common framework of the furnace feeder (not shown) mounting receiver motor 26. A flywheel 74 is mounted on shaft 71 for rotation therewith, and provides one form of rotatable means adapted to alternatively receive and store kinetic energy of rotation from receiver motor 26 when clutch 69 is engaged and, through the same clutch connection, release some of its stored energy to receiver motor 26 when needed. This need for additional energy will normally be called for by motor 26, when, due to peak torque demands, its speed tends to fall behind its synchronized running speed should be at least sufficient to supply energy to supplement the additional torque needed by motor 26 when the torque demands exceed the capacity of the motor at synchronized running speed. It is contemplated that means other than a flywheel may be utilized for storing and releasing kinetic energy of rotation when needed, such as, for example, a combination electric generator-motor and electrical storage system.

The flywheel, when coupled to the receiver motor will control the motor's speed to keep it from breaking synchronization at running speed, but during the stopping and starting of the synchro-tie system, the receiver motor must be uncoupled from the flywheel to prevent overloading the motor by calling on it to suddenly stop and start the flywheel. This invention, therefore, includes means for taking advantage of the flywheel at running speed when desirable by coupling the flywheel and receiver motor gradually to keep from overloading the said motor during picking up the flywheel, and uncoupling the two quickly upon stopping, which means will now be described.

In Fig. 2, clutch 69 is a magnetic particle clutch having a main housing 75 comprising a stator coil 76 adapted to be energized from an electrical control circuit, hereinafter described, connected at lines 77 and 78.

A normally driving rotatable element 68a on its shaft 68 is annularly arranged concentrically in radially spaced relation to a normally driven rotatable element 70a on its shaft 70. The radial spacing between driving and driven elements contains finely-divided ferromagnetic particles 79. Until stator coil 76 is energized, the magnetic particles 79 have an insignificant frictional or bonding effect so that torque transmission is essentially zero and the clutch slips. When the stator coil 76 is energized, a magnetic field is produced in the space between the two elements 68a and 70a. Radial lines of magnetic force develop uniformly around the periphery of the driving and driven elements perpendicular to their face surfaces. Full excitation of the stator coil produces a magnetic-particle bond capable of transmitting torque with zero slip between the driving and driven elements. At lesser degrees of excitation, there is proportional slippage between these rotatable elements 68a and 70a until, at zero excitation, virtually zero torque is transmitted between these two rotatable elements. The degree of torque transmission of the clutch is proportional to and regulated by variation of the exciting current in the stator coil. The clutch may be regulated manually by means of an adjustable resistance or potentiometer or by automatic control means.

Although manual operation of the clutch is one method of operation adaptable for coupling and uncoupling the flywheel in the aforementioned manner, automatic control means is provided as part of this invention which makes the method of operation of the clutch automatic and eliminates need for manipulation of controls by a machine operator. This automatic control will now be described.

In Figs. 1 and 2, stator coil 76 is energized from a 115 volt A.C. supply line 80 connected through a switch 81 in lead lines 77 and 78 to an electrical current control means, designated generally by reference numeral 82, which rectifies the A.C. current to energize stator coil 76 with D.C. current. Control means 82 is connected in circuit to stator coil 76 by its leads 77 and 78.

Included as part of control means 82 is a circuit relay RL1, connected by leads 83 and 84, to be energized responsive to current flow to main drive motor 10 in lines 31 and 32 after starter switch 33 is closed. The relay RL1 permits energizing clutch 69 only when the main motor 10 is started and disconnects the clutch 69 to quickly disengage it whenever power to the main motor 10 is removed.

In the preferred operation of the synchro-tie drive system employing the present invention, the main drive motor 10 is started by closing starter switch 22, and motor 10 and receiver motor 26 accelerate in synchronized relationship up to their running speed, as previously described, during which time clutch 69 is disengaged and its stator coil is deenergized. After reaching running speed, motor 26 is gradually coupled to flywheel 74 by gradually energizing stator coil 76 of the clutch 69 until full excitation of said coil is attained. The motor and flywheel are then completely coupled to drive and be driven one by the other. Energy is stored in flywheel 74 while rotation is imparted to it by motor 26 during times when the load torque demands on it are less than its capacity, however, when the load requirement increases and motor 26 tends to slow down, the stored energy in flywheel 74 releases to assist motor 26 in driving the load past peak requirement.

A further feature of the present invention provides an automatic control circuit illustrated schematically in Fig. 6, which circuit automatically couples the flywheel in the above manner and is included in the electrical current control means 82.

Power to automatically operate the magnetic clutch 69 through electrical control means 82 is obtained from the closed connection of lines 77 and 78 to the 115 volt, 60 cycle A.C. line. A filament transformer 85 has its primary winding 85a connected across the 115 volt alternating current lines. Its secondary winding 85b is connected to and supplies current to the heater 86 of a rectifier tube 87.

A filament transformer 88 has its primary winding 88a connected to the 115 volt alternating current supply across lines 77 and 78. Its secondary winding 88b is connected to and supplies current to the heaters 90a and 91a of two gas filled thyratron tubes 90 and 91.

A transformer 92 has its primary winding 92a connected to the 115 volt alternating current supply across lines 77 and 78. A terminal of a secondary winding 92d of transformer 92 is connected to plate 87a of tube 87. The other terminal of winding 92d is connected to one plate of a capacitor 93. The cathode 87b of the tube 87 connects to the other plate of the capacitor 93. A normally open relay RL2 in series with resistor 94 is connected in parallel with capacitor 93. The combination of rectifier tube 87, capacitor 93, relay RL2, in series with resistor 94, and the transformers 92 and 85 forms a time delay circuit, in that relay RL2 will close only after rectifier tube 87 has been heated to the point where it will conduct current supplied by the transformer winding 92d, thereby charging capacitor 93 to a voltage sufficient to close relay RL2.

The purpose of the time delay circuit is to prevent damage to thyratron tubes 90 and 91. The circuits connected to plates 90b and 91b of the thyratron tubes 90 and 91 are completed by the time delay relay RL2 at contacts 95—96 and 97—98, respectively. The heaters 90a and 91a of the thyratrons 90 and 91 heat to a safe operating temperature before the rectifier tube 87 has heated sufficiently to allow operation of the time delay relay RL2 to close contacts 95—96 and 97—98.

One side of the A.C. power line 77 is connected to a rheostat 99. The other side of rheostat 99 connects to the stator coil 76 of magnetic particle clutch 69. Stator coil 76 is in turn connected to ammeter 100. The other tap of ammeter 100 connects to cathodes 90c and 91c of the two thyratron tubes 90 and 91. The plate 90b of thyratron 90 is connected to the other side of the alternating current line 78 through relay contacts 96—95. The combination of rheostat 99, stator coil 76 of clutch 69, ammeter 100, thyratron 90, closed relay contacts 96—95 and A.C. supply connection at alternating lines 77—78 form a circuit through which the direct current may flow while line 78 is positive to line 77.

The combination of transformer windings 92a, 92b and 92c form an auto-transformer that develops an alternating current voltage across windings 92b and 92c, in series and approximately equal to but 180° out of phase with the alternating current voltage across lines 77 and 78. The junction 101 of transformer windings 92a and 92b connects to junction 102 in line 103 connected to line 77. The extreme terminal of winding 92c connects through relay contacts 97—98 to plate 91b of thyratron 91. The combination of rheostat 99, stator coil 91b of clutch 69, ammeter 100, thyratron 91, relay contacts 98—97, transformer windings 92c—92b, junction 101—102, line 103 and line 77 form a circuit through which a direct current may flow while 77 is positive to 78.

Control of the average plate current through the clutch circuit is accomplished by varying the control grid bias generated at control grids 90 and 91 of thyratron tubes 90 and 91.

When rectifier tube 87 has heated sufficiently, capacitor 93 has a direct current charge across it. The capacitor 93 plate connected to cathode 87b of rectifier tube 87 is positive to the opposite plate of capacitor 93. Resistor 104 is connected in parallel with capacitor 93 so the voltage across capacitor 93 is dropped across resistor 104. An adjustable tap 105 of resistor 104 is connected to cathode 90c and 91c and shield grids 90e and 91e of thyratrons 90 and 91. A set of normally closed relay contacts 106—107—108 of relay RL1 has its contact 106 connected to the negative end 104a of resistor 104. The center relay contact 107 is connected to the center tap 109b of secondary winding 109a of a transformer 109. The end terminals of transformer secondary winding 109a are connected to resistors 110 and 111 which are in turn connected to control grids 90d and 91d of thyratrons 90 and 91, respectively. When relay contacts 106—107 are closed, the thyratrons shield and control grids 90e, 91e, 90d and 91d, respectively, will be maintained at a potential sufficiently negative to their cathodes 90c and 91c by their connection to negative side 104a impressing a negative D.C. voltage to prevent thyratrons 90 and 91 from firing.

A capacitor 112 is connected between cathodes 90c and 91c of thyratrons 90 and 91 and center tap 109b of secondary winding 109a of transformer 109. When relay RL1 deenergizes and relay contacts 106—107 are closed, capacitor 112 quickly charges to the D.C voltage dropped between the negative end 104a of resistor 104 and tap 105 of resistor 104. An adjustable tap 113 of resistor 104 is positioned thereon at a point positive to tap 105. Tap 113 is connected to a resistor 114 which in turn is connected to normally open relay contacts 108—107 of relay RL1. Relay contact 107 in turn is connected in parallel to capacitor 112 and center tap 109b of transformer secondary winding 109a. When contacts 108—107 close and contacts 106—107 open by energizing the coil of relay RL1 upon starting motor 10, capacitor 112 slowly loses its existing negative charge and receives a charge of the opposite polarity (positive) through resistor 114. The positive charge across condenser 112 is then applied through center tap 109b to its transformer secondary winding 109a, resistors 110 and 111, and then to the control grids 90d and 91d of thyratrons 90 and 91.

Windings 92b and 92c of transformer 92 deliver equal voltages and are connected series aiding. The combination of a capacitor 115 in series with a resistor 116 is connected across windings 92b and 92c between junctions 102 and 117. One terminal of the primary winding 109c of transformer 109 is connected to junction 118 between windings 92b and 92c of transformer 92. The other terminal of transformer primary winding 109c of transformer 109 is connected to junction 118 between windings 92b and 92c of transformer 92. The other terminal of transformer primary winding 109 is connected to junction 119 between resistor 116 and capacitor 115. The alternating current voltage across capacitor 115 will be approximately 90 electrical degrees out of phase with the voltage across transformer windings 92b in series with windings 92c. Consequently, the alternating current voltage developed between junction 118 between transformer windings 92b and 92c and junction 119 between capacitor 115 and resistor 116 will be out of phase with the alternating current voltage across transformer winding 92b in series with transformer winding 92c. The alternating current voltage at either of the end terminals of secondary winding 109a, as measured from center tap 109b of windings 109a will be in-phase or 180 out-of-phase with the alternating current voltage at the primary winding 109c of transformer 109, and will be algebraically added to the direct current voltage applied to center tap 109b of transformer secondary winding 109a. The voltage at the end terminals of transformer secondary windings 109a will be applied through the resistors 110 and 111 to control grids 90d and 91d of thyratrons 90 and 91 to fire them alternately.

The windings of transformer 109 are thus connected so that the control grid of either thyratron 90 or 91 will be most negative to its cathode when the positive going excursion of the A.C. voltage applied to its plate commences. As the D.C. component of the control grid voltage progresses in a positive direction, the firing angle of the thyratrons will be advanced so that they will conduct longer during their respective conduction cycles, thereby increasing the average current flow through stator coil 76 of clutch 69. The time required for the stator coil to become fully energized can be controlled by the adjustment of slider 113 on resistor 104 by regulating the magnitude of the positive D.C. voltage component applied to the control grid. Adjustment of the stator coil current while fully "on" is controlled by the setting of rheostat 99.

Fuse 120 in line 78 protects the equipment from damage due to short circuits.

Ammeter 100 provides a visual indication of the average current in the stator coil 76 of the clutch.

Voltmeter 121 is connected in parallel across stator coil 76 to provide a visual indication of the average voltage across the stator coil 76 of the clutch.

Resistor 122 is connected in short across the stator coil 76, and protects the clutch from damage caused by the generation of high voltage surges when the thyratrons 90 and 91 cease to conduct.

Resistors 110 and 111 are current limiting resistors that reduce the thyratrons 90 and 91 grid currents while the thyratrons are "firing," thereby minimizing the effect that the grid current has on the charging and discharging of capacitor 112 through resistor 114.

The coil of relay RL2 is connected at lines 83—84 to the main drive motor power circuit 31—32. The circuitry of electrical control means 82, described above, is fully automatic and gradually energizes the magnetic clutch 69 which in turn gradually brings the flywheel 74 up to machine running speed. When the control means 82 takes over responsive to energizing relay RL1 by starting main drive motor 10, the thyratrons in the clutch excitation circuit are not permitted to fire initially because the control grids of the thyratrons are at a negative potential at the times when their plates are at a positive potential. This condition is obtained due to the charge on condenser 112. As the charge on condenser 112 goes to zero and charges in the opposite direction, as previously explained, the control grids of the thyratrons become positive during increasing intervals of the time the plates are positive and the average current through the clutch gradually increases until the clutch is fully applied.

Whenever the main drive motor 10 is stopped, relay RL1 is deenergized, and the circuitry of electrical control means 82 quickly removes energizing current to stator coil 76 of the magnetic clutch 69 to immediately collapse its magnetic field and effectively disconnect the flywheel 74 from the receiver motor 26 so that it is exclusively under control of the transmitter motor 20 at stopping. This is accomplished by quickly reversing the charge on the condenser 112 back to a negative charge to place a negative bias on the control circuits of the thyratrons, which instantaneously prevents their firing further. Thus, the clutch is completely and quickly disengaged.

Modifications may be resorted to within the spirit and scope of the invention.

We claim:

1. Speed control apparatus for maintaining synchronized running speed of a synchronous electric receiver motor in a synchro-tie motor drive system wherein the drive shaft of said receiver motor is operatively connected to drive a cyclically fluctuating auxiliary load in synchronized relationship with a constantly moving main load driven by the main drive motor of said motor drive system and comprising a rotatable shaft, rotatable means operatively connected to said shaft and adapted to alternatively receive and store kinetic energy of rotation imparted by said shaft and release said stored energy to said shaft, a clutch having a normally driven rotatable element coupled to said rotatable shaft and a normally driving rotatable element operatively connected to the drive shaft of said receiver motor, and control means operatively associated with these two rotatable elements of the clutch for gradually coupling its normally driving element to the normally driven element after starting the main drive motor to impart rotation to said rotatable means and store kinetic energy of rotation therein during operation of said receiver motor at its synchronized running speed and thereafter release said stored kinetic energy to impart rotation from the normally driven element to the normally driving element whenever the speed of said receiver motor tends to fall behind its synchronized running speed, said control being operable for quickly uncoupling the two rotatable elements of the clutch upon stopping the main drive motor.

2. Apparatus defined in claim 1, wherein said rotatable means comprises a flywheel coupled to said rotatable shaft.

3. The combination defined in claim 1, wherein said control means is automatic and actuable responsive to starting and stopping of the main drive motor to gradually couple the said driving and driven elements of said clutch after starting the said main motor and quickly uncouple said driving and driven elements upon stopping said main motor.

4. The combination defined in claim 1, wherein said clutch is a magnetically energized clutch including electrically excitable means for establishing a magnetic field adapted to couple the rotatable driving and driven elements of said clutch and electrical current control means for gradually energizing said means for establishing a field in said clutch after starting the main drive motor and quickly collapsing the said field therein upon stopping the main drive motor.

5. The combination defined in claim 4, wherein the electric excitable means for the clutch includes a stator coil connected in an electrical power circuit, a source of A.C. electric current supplied to said coil for energizing said clutch through said power circuit, and automatic electrical control means in said power circuit and comprising at least one thyratron electrically connected in said power circuit, means for supplying an A.C. voltage to the control grid of each thyratron, a condenser in parallel with said last-mentioned means, a source of D.C.

voltage, an electromagnetic relay normally set to connect said condenser negative to the D.C. voltage source to quickly charge said condenser and provide a negative voltage bias to the control grid of each thyratron to prevent it from conducting current in the power circuit, said relay being connected in the power supply circuit for the main drive motor and moveable responsive to starting said main drive motor to connect the condenser positive to the D.C. voltage source when the relay is thereby energized to reverse the charge of the condenser and gradually remove the negative bias to the control grid of each thyratron to permit it to conduct current in the power circuit during increasing intervals until the stator coil is fully energized.

6. The combination defined in claim 5, wherein the said electrical control means includes a pair of thyratrons electrically connected into the power circuit in parallel and one of the plate circuits connected 90° out of phase with the other in said power circuit to alternately fire said thyratrons whenever they are permitted to conduct.

7. The combination defined in claim 6, wherein said source of D.C. voltage comprises a transformer connected in parallel across said power circuit and a half wave rectifier in circuit with the secondary windings of said transformer, said rectifier including, an electron tube, a capacitance, and a variable resistance in parallel with said capacitance, the adjustable tab of said resistance establishing the connection to supply the said condenser with positive D.C. voltage when the said relay is energized.

8. The combination defined in claim 7, wherein the A.C. electrical source is connected to the power circuit through a switch, and additionally, the plate circuits of the thyratrons are connected individual in the power circuit through corresponding normally open relay contacts, and a second electromagnetic relay having an electromagnetic coil and a circuit closing device operated thereby, said coil being connected in parallel across the plate and grid circuits of the said electron tube of the said rectifier circuit and operable to establish a circuit for the plates of the thyratrons through said closing device whenever said electron tube is operable upon closing the said switch in the power circuit.

9. The combination of a magnetically energized clutch operable to couple normally driving and driven rotatable elements thereof through electrically excitable means for establishing a magnetic bond between said elements, an electric motor operatively connected to drive said rotatable driving element, a source of A.C. electric current supplying a power circuit through said excitable means for energizing the clutch, at least one thyratron in said power circuit, means for supplying an A.C. voltage to the control grid of each said thyratron, a condenser in parallel with said last-mentioned means, a source of D.C. voltage, electroresponsive control means normally set, when inactive, to connect said condenser negative to the D.C. voltage source for quickly charging said condenser and providing a negative voltage bias to the control grid of each thyratron thereby preventing it from conducting current in the power circuit, said control means being activated responsive to starting and running said motor to disconnect said condenser negative to the D.C. source and establish a circuit for said condenser positive to the D.C. voltage source thereby reversing the charge of the condenser and gradually removing the negative bias to the control grid of each thyratron to permit it to conduct current in the power circuit over increasing intervals until the clutch is fully applied, said electroresponsive means, when again inactive, re-establishing the connection of the condenser negative to the D.C. source whereby the clutch is quickly disengaged.

10. The combination defined in claim 9, wherein a pair of gas filled thyratrons have their plate circuits individual to different sides of the power circuit and are connected in parallel therewith, means interposed in one of the said plate circuits for shifting its current out-of-phase with the current in the other plate circuit whereby to permit alternately to fire said thyratron whenever they are permitted to conduct current in the power circuit.

11. The combination defined in claim 9, wherein said electroresponsive control means comprises an electromagnetic relay having contacts for establishing alternative circuits between the D.C. voltage source and the condenser, said relay including an electromagnetic coil and a circuit closing device operated thereby, said device when said coil is inactive, establishing a circuit negative to the condenser, and operable when said coil is activated to establish circuit positive to the condenser, said coil being activated responsive to the power supplied to the electrical motor.

12. In combination a magnetically energized clutch including a rotatable driving element, a rotatable driven element, and electrically excitable means for establishing a magnetic field adapted to couple the rotatable driving and driven elements, and electrical current control means for gradually energizing said excitable means for establishing and progressively increasing a field in said clutch upon energizing said excitable means and quickly collapsing the said field therein upon de-energizing said excitable means, said control means comprising a power circuit for energizing said excitable means, at least one thyratron in said power circuit, means supplying an A.C. voltage to the control grid of the thyratron, a condenser in parallel with the said last-mentioned means, a source of D.C. voltage, an electro-magnetic relay including an electro-magnetic coil, said relay being normally set to connect said condenser negative to the D.C. voltage source and provide a negative voltage bias to the control grid of the thyratron to prevent conducting current in the power circuit, switch means in a circuit with the relay coil, said coil being energized upon closing the circuit inclusive of said switch means and actuate the relay to connect the condenser positive to the D.C. voltage source to reverse the charge of the condenser and gradually remove the negative bias on the control grid of the thyratron, whereby to permit the thyratron to conduct current in the power circuit.

13. In a synchro-tie system having a main drive motor driving a main load governing the speed of the system and a receiver motor driving a pulsating auxiliary load having a predetermined cycle calling for accelerating and decelerating movement in a synchronized relationship with the main load, the improvement for maintaining the receiver motor synchronized with the main motor, said improvement comprising rotatable means having characteristics for receiving, storing and giving up energy, means including an automatic control operable for gradually coupling said rotatable means to the receiver motor after said motor has reached its synchronized running speed and drive said rotatable means by said receiver motor when the latter is operating at its synchronized running speed and said coupled rotatable means driving said receiver motor with energy stored therein whenever the receiver motor tends to decelerate below its synchronized running speed, said control being operable for quickly uncoupling said rotatable means from the receiver motor responsive to stopping the synchro-tie system.

14. In a synchro-tie drive system having a main drive motor driving a main load governing the speed of the system and a receiver motor driving a pulsating auxiliary load having a predetermined cycle calling for accelerating and decelerating movement in synchronized relationship with the main load, the improvement for maintaining the receiver motor synchronized with the main motor, said improvement comprising, rotatable means operable as an inertia load, clutch means for coupling said inertia load to the receiver motor and uncoupling said load therefrom, and automatic control means operable for gradually effecting the coupling of said load after the receiver motor has reached its synchronized running speed, whereupon alternatively said motor while operating at said running speed will drive said inertia load and said load will drive said motor by energy stored therein whenever said motor tends to fall below its said running speed, said automatic control means being further characterized by being operable for quickly uncoupling said inertia load from the receiver motor responsive to stopping the synchro-tie system.

References Cited in the file of this patent

UNITED STATES PATENTS

| | | |
|---|---|---|
| 1,331,536 | Soubier | Feb. 24, 1920 |
| 1,531,560 | Lynch | Mar. 31, 1925 |
| 1,531,561 | Lynch | Mar. 31, 1925 |
| 1,762,130 | Davis | June 3, 1930 |
| 1,823,062 | Pleukharp et al. | Sept. 15, 1931 |
| 2,288,466 | Langer | June 30, 1942 |
| 2,482,020 | Meagher et al. | Sept. 13, 1949 |
| 2,548,542 | MacGeorge | Apr. 10, 1951 |
| 2,650,301 | Farmer | Aug. 25, 1953 |